United States Patent
Penning et al.

(10) Patent No.: US 10,639,874 B2
(45) Date of Patent: May 5, 2020

(54) PROCESS FOR LAMINATING A POLYMERIC FILM TO A METAL STRIP SUBSTRATE AND A METAL STRIP SUBSTRATE PRODUCED THEREBY

(71) Applicant: TATA STEEL IJMUIDEN B.V., Velsen-Noord (NL)

(72) Inventors: Jan Paul Penning, The Hague (NL); Andrew John Fagan, Llanelli (GB)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 45 days.

(21) Appl. No.: 16/060,697

(22) PCT Filed: Oct. 24, 2016

(86) PCT No.: PCT/EP2016/075516
§ 371 (c)(1),
(2) Date: Jun. 8, 2018

(87) PCT Pub. No.: WO2017/102143
PCT Pub. Date: Jun. 22, 2017

(65) Prior Publication Data
US 2018/0354248 A1    Dec. 13, 2018

(30) Foreign Application Priority Data
Dec. 17, 2015    (EP) .................................... 15200889

(51) Int. Cl.
*B32B 37/00* (2006.01)
*B32B 15/09* (2006.01)
(Continued)

(52) U.S. Cl.
CPC ............ *B32B 37/0053* (2013.01); *B32B 7/12* (2013.01); *B32B 15/08* (2013.01); *B32B 15/082* (2013.01); *B32B 15/085* (2013.01); *B32B 15/088* (2013.01); *B32B 15/09* (2013.01); *B32B 15/18* (2013.01); *B32B 15/20* (2013.01); *B32B 27/08* (2013.01); *B32B 27/18* (2013.01);
(Continued)

(58) Field of Classification Search
CPC ... B32B 37/0053; B32B 37/04; B32B 37/085; B32B 37/1284; B32B 37/203; B32B 38/1875; B32B 2307/516; B32B 2309/16; B32B 37/144; B32B 38/1825; B29C 66/343; B29C 66/344
USPC ........................... 156/308.2–309.9, 322, 324
See application file for complete search history.

(56) References Cited

U.S. PATENT DOCUMENTS

2014/0072742 A1* 3/2014 Penning .................. B32B 15/04
428/35.8

FOREIGN PATENT DOCUMENTS

| EP | 0312304 A1 | 4/1989 |
|---|---|---|
| GB | 1566422 A | 4/1980 |

(Continued)

OTHER PUBLICATIONS

International Search Report and Written Opinion dated Jan. 24, 2017 for PCT/EP2016/075516 to Tata Steel Ijmuiden B.V. filed Oct. 24, 2016.

*Primary Examiner* — John L Goff, II
(74) *Attorney, Agent, or Firm* — Vorys, Sater, Seymour and Pease LLP

(57) ABSTRACT

A process for laminating a polyester film onto a major surface of a metal strip and to a laminated metal strip produced thereby, or a can produced therefrom.

12 Claims, 2 Drawing Sheets

(51) Int. Cl.

| | | |
|---|---|---|
| B32B 37/04 | (2006.01) | |
| B32B 37/20 | (2006.01) | |
| B32B 38/00 | (2006.01) | |
| B32B 38/18 | (2006.01) | |
| B32B 7/12 | (2006.01) | |
| B32B 27/08 | (2006.01) | |
| B32B 27/18 | (2006.01) | |
| B32B 15/082 | (2006.01) | |
| B32B 27/36 | (2006.01) | |
| B32B 27/30 | (2006.01) | |
| B32B 15/085 | (2006.01) | |
| B32B 15/088 | (2006.01) | |
| B32B 15/20 | (2006.01) | |
| B32B 15/18 | (2006.01) | |
| B32B 27/32 | (2006.01) | |
| B32B 27/28 | (2006.01) | |
| B32B 27/34 | (2006.01) | |
| B32B 15/08 | (2006.01) | |
| B32B 37/12 | (2006.01) | |

(52) U.S. Cl.
CPC ............ *B32B 27/281* (2013.01); *B32B 27/30* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 37/0007* (2013.01); *B32B 37/04* (2013.01); *B32B 37/085* (2013.01); *B32B 37/1284* (2013.01); *B32B 37/203* (2013.01); *B32B 38/1825* (2013.01); *B32B 38/1875* (2013.01); *B32B 2250/05* (2013.01); *B32B 2250/40* (2013.01); *B32B 2255/06* (2013.01); *B32B 2255/205* (2013.01); *B32B 2270/00* (2013.01); *B32B 2307/514* (2013.01); *B32B 2307/516* (2013.01); *B32B 2307/54* (2013.01); *B32B 2307/72* (2013.01); *B32B 2307/732* (2013.01); *B32B 2309/02* (2013.01); *B32B 2309/12* (2013.01); *B32B 2309/14* (2013.01); *B32B 2309/16* (2013.01); *B32B 2311/00* (2013.01); *B32B 2367/00* (2013.01); *B32B 2419/00* (2013.01); *B32B 2439/00* (2013.01); *B32B 2439/66* (2013.01); *B32B 2479/00* (2013.01); *B32B 2605/00* (2013.01); *B32B 2605/18* (2013.01)

(56) References Cited

FOREIGN PATENT DOCUMENTS

| | | |
|---|---|---|
| WO | 2012146654 A1 | 11/2012 |
| WO | 2014202316 A1 | 12/2014 |
| WO | 2015150073 A1 | 10/2015 |

* cited by examiner

PROCESS FOR LAMINATING A POLYMERIC FILM TO A METAL STRIP SUBSTRATE AND A METAL STRIP SUBSTRATE PRODUCED THEREBY

CROSS-REFERENCE TO RELATED APPLICATIONS

This is a § 371 National Stage Application of International Application No. PCT/EP2016/075516 filed on Oct. 24, 2016, claiming the priority of European Patent Application No. 15200889.2 filed on Dec. 17, 2015.

FIELD OF THE INVENTION

This invention relates to a process for laminating a polymeric film to a metal strip substrate and a metal strip substrate produced thereby.

BACKGROUND OF THE INVENTION

In the packaging industry the use of polymer-coated substrates is becoming more and more common in the production of cans. The polymer coated substrate can be produced by extruding a molten polymer film directly onto the metallic substrate or by producing a thermoplastic polymer film that is subsequently laminated, as a solid film, onto a metallic substrate in an integrated or separate lamination process step.

Lamination is usually performed by leading the polymer film and the substrate through a lamination nip formed by two or more rolls pressing the coating onto the metallic strip. A proper adhesion between the polymer film and the substrate is achieved by heat sealing of the polymer coating film onto the metallic substrate, wherein the film and/or the substrate may be heated to promote the heat sealing, or by using an (liquid) adhesion promoter that is applied to the polymer coating film and/or the substrate prior to the lamination step and which is subsequently cured to obtain the adhesive effect.

WO2012146654 discloses a process wherein a substrate is provided with a polymer film on one or both of the major surfaces. The polymer films used in this process are so-called machine direction oriented (MDO) films, or uni-axially oriented films.

This is a deviation of the more commonly used biaxially oriented (biax) films in these types of lamination processes, as described e.g. in EP0312304. This process relies on using films that are isotropic or 'balanced' in their properties. An example is the application of poly(ethylene terephthalate) (PET) films on steel substrates. The most common type of PET films for this purpose is the biax film. Biax PET film is produced by orienting a cast PET film in the machine direction and in a direction perpendicular to the machine direction (cross- or transverse direction). After applying the biaxial orientation, the films are usually heat set by exposing the films to an elevated temperature under tension for a short period of time. As a result, the films have balanced mechanical properties and exhibit excellent dimensional stability. These biaxially oriented, heat-set PET films show little tendency for wrinkling or creasing while processing, for instance during laminating to a rigid substrate.

A problem with using machine direction oriented films in a lamination film is that the stability of the film during lamination is less than the stability of a biaxially oriented film. On the other hand, a biaxially oriented film is more expensive and these are only available as a pre-prepared film. Equipment for producing biaxially oriented, heat-set PET film furthermore requires a large capital expenditure and is inflexible toward changes in the film composition or recipe.

A known danger in polymer film lamination processes is wrinkling prior or during the lamination step. This results in defective products, and results in high rejection rates and associated costs. This danger is somewhat higher when using MDO-film as compared to using biax-films.

SUMMARY OF THE INVENTION

It is an object of this invention to provide a process for laminating a polyester film onto a major surface of a metal strip with a decreased risk of wrinkling.

It is also an object of this invention to provide a process for laminating an MDO-polyester film onto a major surface of a metal strip with a good process stability. This object is reached with a process for laminating a polyester film onto a major surface of a metal strip in a coating line comprising the subsequent steps of:

providing a metal strip;
providing a Machine Direction Oriented polyester film having a room-temperature yield stress YS for laminating onto the major surface of the substrate;
providing an adhesion layer for promoting the adhesion between the substrate and the polyester film, and/or heating the metal strip substrate to a temperature T1 above Tg and below Tm of the polyester facing the major surface of the metal strip substrate;
forming a laminate by pressing the polyester film onto the substrate by means of laminating rolls, wherein a laminating pressure is exerted on the laminate in the nip between the laminating rolls, and wherein a tension is exerted on the polyester film in the longitudinal direction of the film prior to the nip;
wherein the line speed of the coating line is v (in m/min) and wherein the tension as a percentage of the yield stress (YS) of the polyester film ($X_{tens}$) is at least $$X_{tens}\,(\%)=50 \cdot v^{-0.46} \quad \text{(eq. 1)}$$

and the tension $F_{tens}$ on the polyester film in MPa is $$F_{tens}=YS*X_{tens}\,(\%); \quad \text{(eq. 2)}$$

heating the laminate to a temperature above Tm of the polyester film to melt the polyester film;
quenching the heated laminate with the molten polyester film to a temperature below Tg of the polyester film.

DETAILED DESCRIPTION OF THE INVENTION

Figure 1:
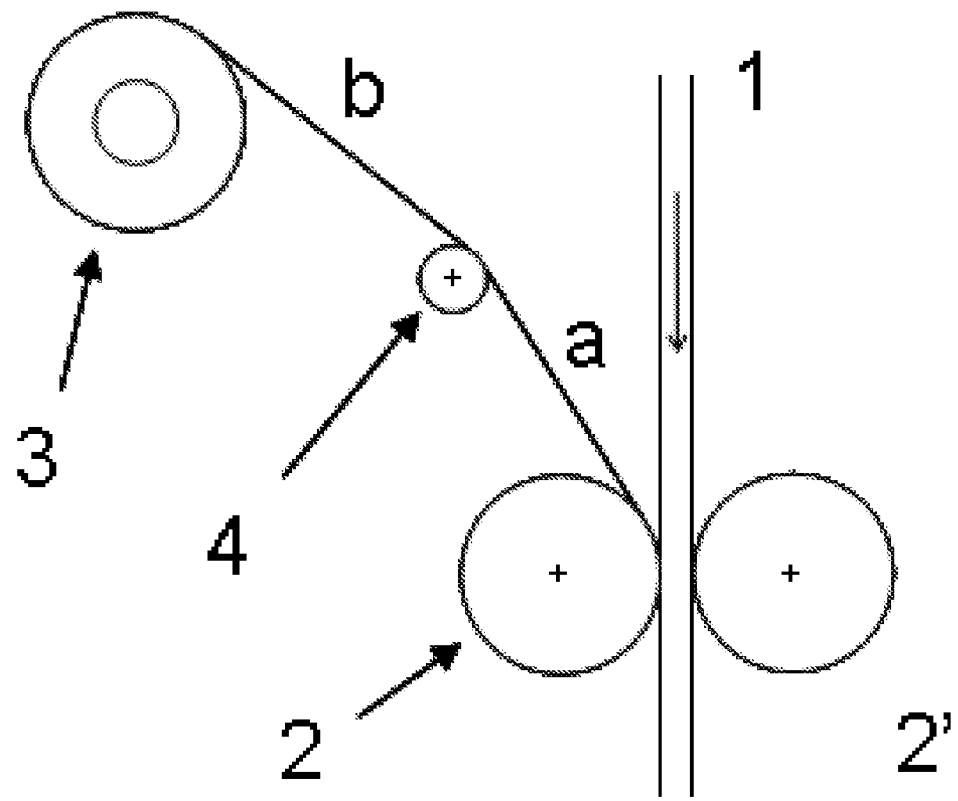
FIG. 1 shows a pair of lamination rolls jointly forming a nip through which a metal strip is led with a direction of movement as indicated with an arrow.

The highly anisotropic, non heat-set MDO films are susceptible to wrinkling while processing in a laminating process. In a laminating process, both the substrate and the (polymeric) film to be laminated to the substrate are passed over multiple rollers, bridles, steering units, etc. In addition, substrate and film are usually subjected to various temperature regimes as required by the laminating process. All variation in film travelling direction, film tension and film temperature may lead to the formation of wrinkles and creases, which, when passing through the laminating nip, will lead to defects in the laminated product. We have found that the above-mentioned anisotropic, non heat-set polymeric films are particularly susceptible to wrinkling and creasing in these processes. By selecting the appropriate combination of film tension and process line speed according to the invention, wrinkling and creasing in this type of film can be effectively eliminated. With the phrase 'a tension is exerted on the polyester film in the longitudinal direction of the film between last roll before the lamination roll and the entry side of the lamination nip prior to forming of the laminate' the inventors mean that the tension in the longitudinal direction according to the invention is present in the film prior to the moment the film and the metal strip enter the nip between the lamination rolls. By means of explanation, but by no means with the intention to be limited by this particular embodiment, FIG. 1 shows a pair of lamination rolls 2 and 2' jointly forming a nip through which a metal strip 1 is led with a direction of movement as indicated with the arrow. The film, in this example, is uncoiled from a coil 3 and guided over a guiding roll 4 towards the nip. According to the invention the tension $F_{tens}$ according to (eq. 2) may be present in section (a) if guiding roll 4 acts as a tensioning roll, or in section (a) and (b) in equal measure if guiding roll 4 is purely a guiding roll, or wherein the tension in section a and b is different, as long as the maximum tension is as prescribed according to the invention. The tension in section (a) is the tension in the polymer film just prior to the nip, i.e. in the film on the entry side of the laminating rolls. This principle stays the same if there are more sections between the uncoiler and the nip or between the machine-direction-orientation unit and the nip in case the film is cast, stretched and immediately laminated onto a strip. If there are more sections in addition to sections (a) and (b) then the maximum tension in at least one of these sections is $F_{tens}$.

In the process according to the invention the MDO-polyester film is provided to the process either by uncoiling an MDO-film from a coil, or by producing a film and stretching it to form an MDO-polyester film. Whichever way the MDO-polyester film is provided, it is transported through the lamination device to the nip between the laminating rolls. According to the invention a tension is exerted on the polyester film in the direction of movement of the film through the lamination device so that the film is under this tension between the nip between the laminating rolls and the guiding or tensioning rolls preceding the nip. The inventors found that when this tension is too high, that there is a risk of failure (i.e. primarily localised yield, and rupture in extreme cases) of the polyester strip, and when the tension is too low, that there is a risk of wrinkles or blisters. The tension according to the invention, which is expressed as a function of the speed v of the coating line, was found to be very effective in preventing wrinkles or blisters, whereas the tension is too low to cause ripping or localised yield of the film. The anisotropic, non heat-set MDO-films are susceptible to wrinkling and creasing in these processes. By selecting the appropriate film tension level and process line speed, wrinkling and creasing in this type of film can be effectively eliminated. MDO film can be produced at relatively small-scale and relatively inexpensive equipment, with great flexibility in film recipe or composition. Thus, the method according to the invention provides a method for producing a wide variety of laminated materials in an economically feasible process.

In an embodiment the process according to the invention is applied to both major surfaces of the metal strip, and preferably both polyester films are MDO-polyester films.

In an embodiment of the invention the tension immediately before the nip is $F_{tens}$ in accordance with (eq. 2). Referring to the schematic image presented in FIG. 1, the tension in section (a) is $F_{tens}$ in this embodiment.

In a preferable embodiment the tension as a percentage of the yield stress (YS) of the polyester film ($X_{tens}$) is at most 9.5%, preferably at most 9%, more preferably at most 8.5%. At the speeds of an industrial coating line $X_{tens}$ according to the invention is lower as the speed increases. At the lower end of the speed range, e.g. during start-up, the tension may be too high, depending on the speed, and therefore the $X_{tens}$ is preferably maximised at most 9.5% of the yield stress. In that case $$50 \cdot v^{-0.46}\% < X_{tens} (\%) \leq 9.5\%$$

Preferably $X_{tens}$ is maximised to at most 9%, preferably at most 8.5% or even at most 8%.

In an embodiment wherein the polyester film(s) comprise(s) or consist(s) of one or more of a polymer from the group of polymers consisting of polycondensates, such as polyesters, co-polyesters or polyamides, or blends comprising thereof. The polymer coating may consist of one or more layers. The process according to the invention has particular advantages when producing polymer films which consist of essentially linear, thermoplastic polymers produced by polycondensation reactions (polyesters, polyamides, polycarbonates, polyimides etc). This structure limits the speed at which these polymers can be extruded and therefore extrusion coating for these polymers is limited to relatively low speeds.

In a preferable embodiment the MDO-film comprises or consists of polyethylene terephthalate, IPA-modified polyethylene terephthalate, CHDM-modified polyethylene terephthalate, polybutylene terephthalate, polyethylene naphthalate, or copolymers or blends thereof.

The metallic substrate can be an uncoated metal such as steel or aluminium or aluminium alloys or a metallic-coated metal such as tinplate, or galvanised steel, and may contain an additional conversion layer or passivation layer to further enhance the product performance and/or promote adhesion between the metal and the polymer coating. This additional conversion layer or passivation layer can e.g. be based on chromium oxide, chromium/chromium oxide, preferably based on Cr(III), titanium oxide, zirconium oxide, phosphates. So the metallic substrate also includes ECCS (aka Tin Free Steel (TFS)) and comparable substrates like the ones described in WO2014202316.

In an embodiment the lamination pressure in the laminating step is between 0.1 MPa and 10 MPa. Higher values will result in excessive wear of the lamination rolls, lower pressure will result in insufficient adhesion between the coating and the metal and in an increased risk of air entrapment. Preferably the lamination pressure in the laminating step is at least 0.5. Preferably the lamination pressure in the laminating step is at most 2.5 MPa. After the nip, the coated strip is optionally cooled using e.g. cold air, in order to impart sufficient rigidity, strength and/or toughness for further handling of the semi-finished product and to allow contact with additional rolls which may be present in the lamination process (deflector rolls etc).

After cooling, the essential post-heating step is applied. The temperature setting of the post-heat is defined by the polymer properties. The stretched film is highly oriented and, if crystallisable polymers are used, highly crystalline. The post-heat temperature is chosen such that the orientation and crystallinity is removed within the chosen residence time in the post-heat section. The residence time is preferably at least 0.5 seconds, more preferably 1 second and preferably at most 10 seconds, or preferably at most 5 seconds. For polycondensates, such as polyesters or polyamides, the post-heat temperature is preferably between Tm and Tm+50° C. Although it is preferable that all orientation and crystallinity is removed, an amount of crystallinity and/or orientation is allowable. However, this must not exceed more than 30% of the crystallinity and/or orientation which existed prior to the post-heat, and preferably not more than 10%. A method for measuring crystallinity by X-ray diffraction is given in GB1566422, page 5 line 31-50. Alternatively the crystallinity can be determined from density measurements as described in EP0312304, page 2, line 27-37, Crystallinity can also be determined by differential scanning calorimetry (DSC), e.g. using a Mettler Toledo DSC821e calorimeter operated at a sample heating rate of 10° C./min. The hot metal coated strip is cooled very rapidly after exiting the post-heat section. This is preferably done in a cold water bath, but could also be done with cooled rolls or cold gasses, as long as the cooling rate of the polymer film is at least 100° C./s, more preferably at least 400° C./s.

Although the polymer film produced according to the invention can be used for applications other than cans or containers, it is particularly suitable for those applications where properties like adhesion, barrier properties and formability are essential. This makes it very suitable for the production of cans and containers. However the film may also be used in the production of laminated metal substrates for building materials, furniture or materials for transport applications (automotive, aerospace, etc).

Polymer-metal laminates made using this process may be used for cans or containers, more preferably formed cans made using deep drawing and/or stretching and/or wall ironing.

The invention is now further explained by means of the following, non limiting examples.

Polyester MDO films were obtained by casting an extruded polyester film and stretching the cast film in the Machine Direction in an integrated cast film/MDO process. The cast films are produced using an extrusion unit consisting of a drying system for polymer granulate, granulate dry-blending and mixing system, three separate single-screw extruders, a feedblock and die assembly, and a chilled cast roll. Appropriate dry blends of polymer granules were fed to the three extruders, where the granules are melted, pressurised and transported to the feedblock, and subsequently passed through a flat die, so as to obtain a three-layer film having an adhesion layer, a main layer and a top layer. The extruded film is cast onto the chilled cast roll, cooled, edge-trimmed and then directly passed on to the MDO stretching unit. The amount of polymer passed through the extruders per unit time and the cast roll speed are adjusted so as to achieve the desired cast film thickness.

The MDO stretching unit consists of several heated and/or cooled rolls which are aimed to heat the cast film to the desired stretching temperature, stretch the film to the desired Draw Ratio (DR) and subsequently cool the stretched film to a temperature below 40° C. The film is then trimmed to the desired width and wound using a high speed film winder. The MDO process settings may vary depending on the chemical composition of the film, the desired thickness of the stretched film and the desired mechanical properties. In general, the stretching temperature is set between 55 and 95° C. and the draw ratio is set between DR=2.5 and 5.0. The cast film thickness is chosen in a such a way that, at the selected optimum Draw Ratio for the film, the stretched film reaches the desired final thickness for the MDO film. Final MDO film thicknesses in the present examples are between 15 and 30 μm and final film winding speed vary between 140 and 280 m/min.

In the Examples below, five different types of polyester resin were used to produce different types of polyester films:
PET: poly(ethylene terephthalate) copolymer in which about 3 mole % of terephthalic acid monomer units has been replaced with isophthalic acid (IPA) monomer units
PETg: poly(ethylene terephthalate) copolymer in which about 30 mole % of ethylene glycol monomer units has been replaced with cyclohexane-dimethanol (CHDM) monomer units
PBT: poly(butylene terephthalate) homopolymer
$TiO_2$ MB: a 50/50 weight % mixture of $TiO_2$ and CHDM-PET
RA MB: a PET-based masterbatch containing a release and/or anti-block agent

TABLE 1

Polyester film redoes

| Code | Adhesion layer | Main layer | Top layer |
|---|---|---|---|
| I | 70% PETg<br>28-29% PET<br>1-2% RA MB | 100% PET | 98-99% PET<br>1-2% RA MB |
| II | 73-74% PET<br>25% PBT<br>1-2% RA MB | 75% PET<br>25% PBT | 73-74% PET<br>25% PBT<br>1-2% RA MB |
| III | 98-99% PET<br>1-2% RA MB | 62% PET<br>38% TiO2 MB | 98-99% PET<br>1-2% RA MB |
| IV | 70% PETg<br>28-29% PET<br>1-2% RA MB | 67% PET<br>33% TiO2 MB | 98 99% PET<br>1-2% RA MB |

Various experiments were performed using the polymer films from table 1 at thicknesses of 15, 20, 21 and 30 μm, using different line speeds.

Figure 2:
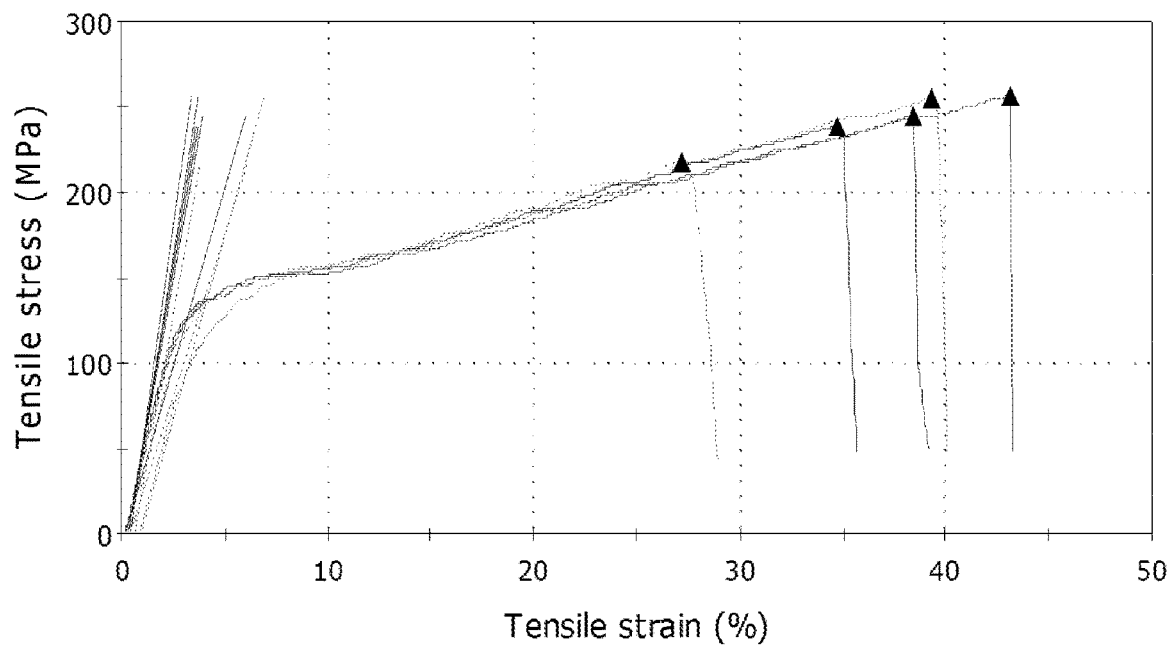
FIG. 2 shows a plot of a machine direction stress-strain curve of a polyester MDO film according to an example.

Film mechanical properties were determined using an Instron 5587 tensile tester equipped with pneumatic grips, operated at 40 mm sample gauge length and a cross-head speed of 40 mm/min. Film samples of 10 mm in width and about 80 mm in length were cut from the films using a surgical knife. Film thickness was determined from the weight of a film sample of known length and width, using a density ranging from 1330 to 1450 kg/m³ depending on the film composition. Film mechanical properties were determined in the machine direction, i.e. the long axis of the test specimen is parallel to the machine direction of the film. The yield stress of the film was determined from the stress at which the minimum in the slope of the stress-strain curve occurred. In FIG. 2 an example is given of a typical machine direction stress-strain curve of a polyester MDO film according to recipe A at DR=4.0 and final film thickness of 20 μm. In this case the minimum in the slope of the stress-strain curve occurs at a tensile strain of ca. 8% and a corresponding tensile stress of 150 MPa. In other words, the machine direction yield stress in this particular example is 150 MPa MDO films of various coating recipe (I-IV), process condition and final thickness (15-30 μm), having Yield Stress values ranging from 80-170 MPa were laminated onto steel (ECCS, TFS) substrate material using a film laminating line. The strip pre-heat temperature was 225° C. The width of the film and steel substrate was in the range 750-1000 mm. Laminating line speeds were varied between 15 and 60 m/min and film tension was varied between 150 N and 450 N. This corresponds to 7 MPa to 25 MPa depending on film tension and width, and corresponds to 5.0-17.0% of the machine direction yield stress depending on film type. The laminated products were visually inspected for the presence of coating defects such as wrinkles and creases.

Figure 3:
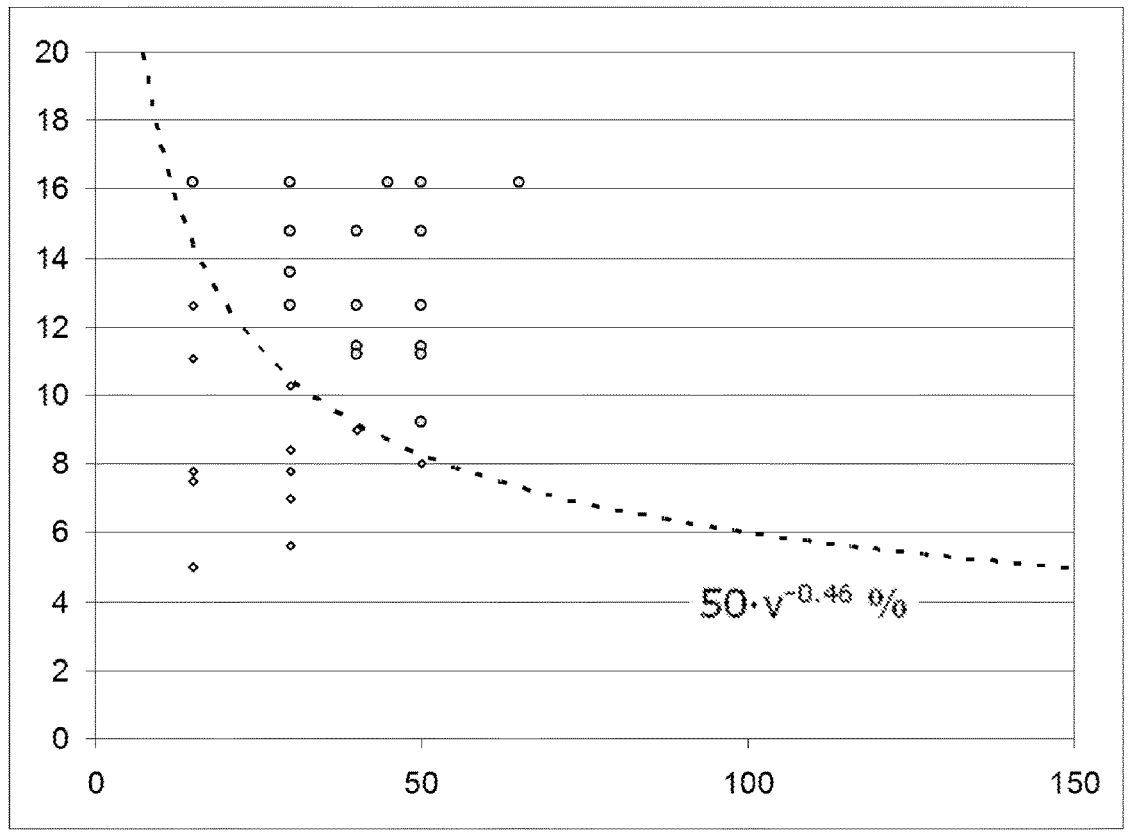
FIG. 3 shows a plot in which the X-axis gives the line speed of a line (in m/min), and the Y-axis gives $X_{tens}$ (tension as a percentage of the yield stress (YS) of the polyester film in %) with the equation $X_{tens}\,(\%)=50 \cdot v^{-0.46}$ presented as a dashed line.

When collating the results in a graph it becomes apparent that above a certain value no creases or wrinkles occur (the circles in FIG. 3) and below a certain value creases and/or wrinkles do occur (the diamonds in FIG. 3). On the basis of these findings the tension stress values needed for higher line speeds can be easily predicted. The X-axis gives the line speed of the line (in m/min), and the Y-axis gives $X_{tens}$ (in %). Eq. 1 is presented in FIG. 3 as a dashed line.

The invention claimed is:

1. A process for laminating a polyester film onto a major surface of a metal strip in a coating line comprising the subsequent steps of:
   providing a metal strip substrate;
   providing a Machine Direction Oriented polyester film having a room-temperature yield stress YS for laminating onto the major surface of the metal strip substrate;
      providing an adhesion layer for promoting the adhesion between the metal strip substrate and the polyester film, and/or
      heating the metal strip substrate to a temperature T1 above Tg and below Tm of the polyester facing the major surface of the metal strip substrate;
   forming a laminate by pressing the polyester film onto the metal strip substrate by means of laminating rolls, wherein a laminating pressure is exerted on the laminate in a nip between the laminating rolls, and wherein tension is exerted on the polyester film in the longitudinal direction of the film prior to entering the nip;
   wherein the line speed of the coating line is v (in m/min) and wherein the tension as a percentage of the yield stress (YS) of the polyester film ($X_{tens}$) is at least $$X_{tens}(\%) = 50 \cdot v^{-0.46} \qquad \text{(eq. 1)}$$

and the tension ($F_{tens}$) on the polyester film in MPa is $$F_{tens} = YS * X_{tens}(\%); \qquad \text{(eq. 2)}$$

heating the laminate to a temperature above Tm of the polyester film to melt the polyester film;
quenching the heated laminate with the molten polyester film to a temperature below Tg of the polyester film.

2. The process according to claim 1, wherein the polyester film is laminated onto both major surfaces of the metal strip, and wherein the tension is exerted on both polyester films in the longitudinal direction prior to the forming of the laminate.

3. The process according to claim 1, wherein the tension is exerted on the polyester film in the longitudinal direction immediately prior to the forming of the laminate.

4. The process according to claim 1, wherein $X_{tens}$ (%) is at most 9.5%.

5. The process according to claim 1, wherein the polyester film comprises one or more of a polymer from the group of polymers consisting of:
   polycondensates, and
   crystallisable polyaddition polymers.

6. The process according to claim 5, wherein the polyester film is stretched in the longitudinal direction and comprises a member of the group consisting of polyethylene terephthalate, isophthalic acid-modified polyethylene terephthalate, cyclohexanedimethanol-modified polyethylene terephthalate, polybutylene terephthalate, polyethylene naphthalate, or copolymers or blends thereof.

7. The process according to claim 5, wherein the laminating pressure in the laminating step is between 0.1 MPa and 10 MPa.

8. The process according to claim 5, wherein $$X_{tens}(\%) = 55 \cdot v^{-0.46}.$$

9. The process according to claim 1, wherein $X_{tens}$ (%) is at most 9%.

10. The process according to claim 1, wherein $X_{tens}$ (%) is at most 8.5%.

11. The process according to claim 5, wherein the polyester film is stretched in the longitudinal direction and consists of a member of the group consisting of polyethylene terephthalate, isophthalic acid-modified polyethylene terephthalate, cyclohexanedimethanol-modified polyethylene terephthalate, polybutylene terephthalate, polyethylene naphthalate, or copolymers or blends thereof.

12. The process according to claim 5, wherein the laminating pressure in the laminating step is between at least 0.5 MPa and at most 2.5 MPa.

* * * * *